(12) United States Patent
Cheben et al.

(10) Patent No.: US 7,376,308 B2
(45) Date of Patent: May 20, 2008

(54) OPTICAL OFF-CHIP INTERCONNECTS IN MULTICHANNEL PLANAR WAVEGUIDE DEVICES

(75) Inventors: Pavel Cheben, Ottawa (CA); Siegfried Janz, Gloucester (CA); Boris Lamontagne, Gatineau (CA); Dan-Xia Xu, Gloucester (CA)

(73) Assignee: National Research Council of Canada, Ottawa, ON (CA)

( * ) Notice: Subject to any disclaimer, the term of this patent is extended or adjusted under 35 U.S.C. 154(b) by 335 days.

(21) Appl. No.: 11/016,715

(22) Filed: Dec. 21, 2004

(65) Prior Publication Data
US 2005/0141808 A1    Jun. 30, 2005

Related U.S. Application Data

(60) Provisional application No. 60/481,828, filed on Dec. 24, 2003.

(51) Int. Cl.
*G02B 6/26* (2006.01)
*G02B 6/34* (2006.01)
(52) U.S. Cl. .......................... 385/37; 385/27; 385/31; 385/43; 385/47; 385/132
(58) Field of Classification Search ................. 385/27, 385/31, 37, 39, 43, 47, 129–132
See application file for complete search history.

(56) References Cited

U.S. PATENT DOCUMENTS 6,706,546 B2 *   3/2004   Yoshimura et al. ........... 438/31

OTHER PUBLICATIONS

D.A.B. Miller, "Rationale And Challenges For Optical Interconnects To Electronic Chips" Proc. IEEE, vol. 88, pp. 728-749 (2000).
Y. Li et al , "Optical Interconnects For Digital Systems", Proc. IEEE, vol. 88 pp. 723-863 (2000).
Masayuki Matsumoto, "Analysis of The Blazing Effect in Second Order Gratings", IEEE Journal of Quantum Electronics, vol. 28, No. 1- pp. 2016-2023 (1992).

* cited by examiner

*Primary Examiner*—Frank G. Font
*Assistant Examiner*—Michael P. Mooney
(74) *Attorney, Agent, or Firm*—Richard J. Mitchell; Marks & Clerk

(57) ABSTRACT

The multichannel waveguide device includes an array of waveguides located in a plane. Each waveguide channel has a redirecting element for redirecting a guided wave out of said plane, or vice versa. The redirecting elements are staggered in the direction of the waveguides so as to transform a one-dimensional array of in-plane waves into a two-dimensional array of out-of-plane waves, or vice versa.

24 Claims, 12 Drawing Sheets

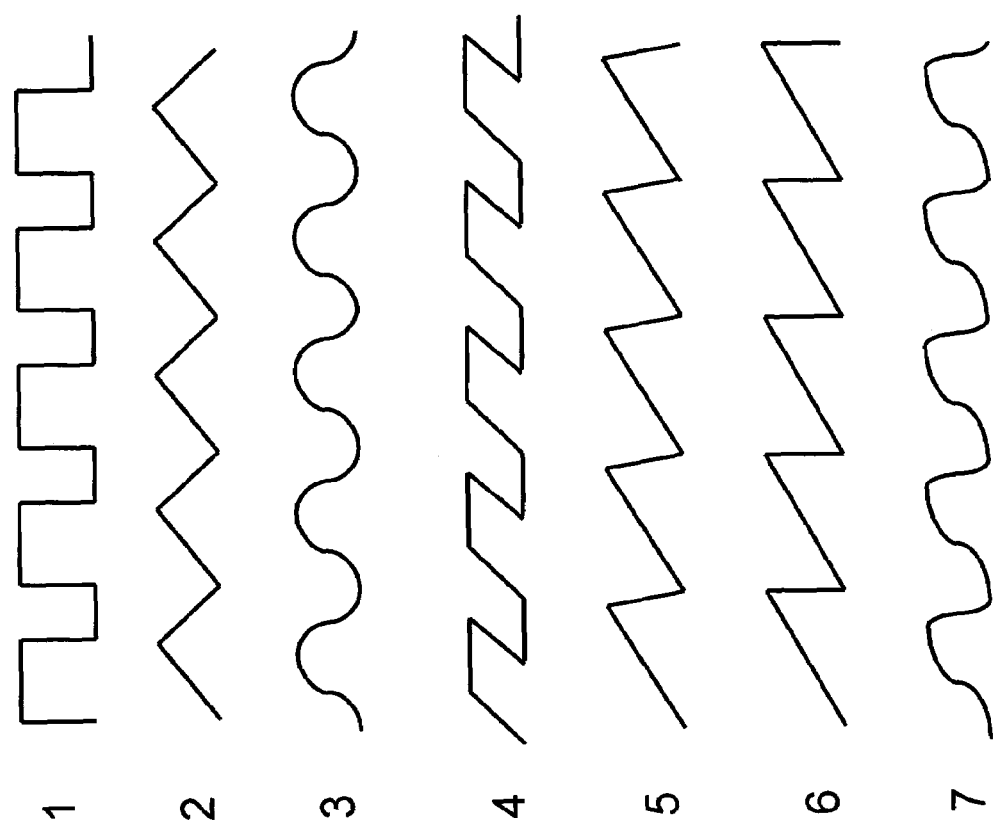

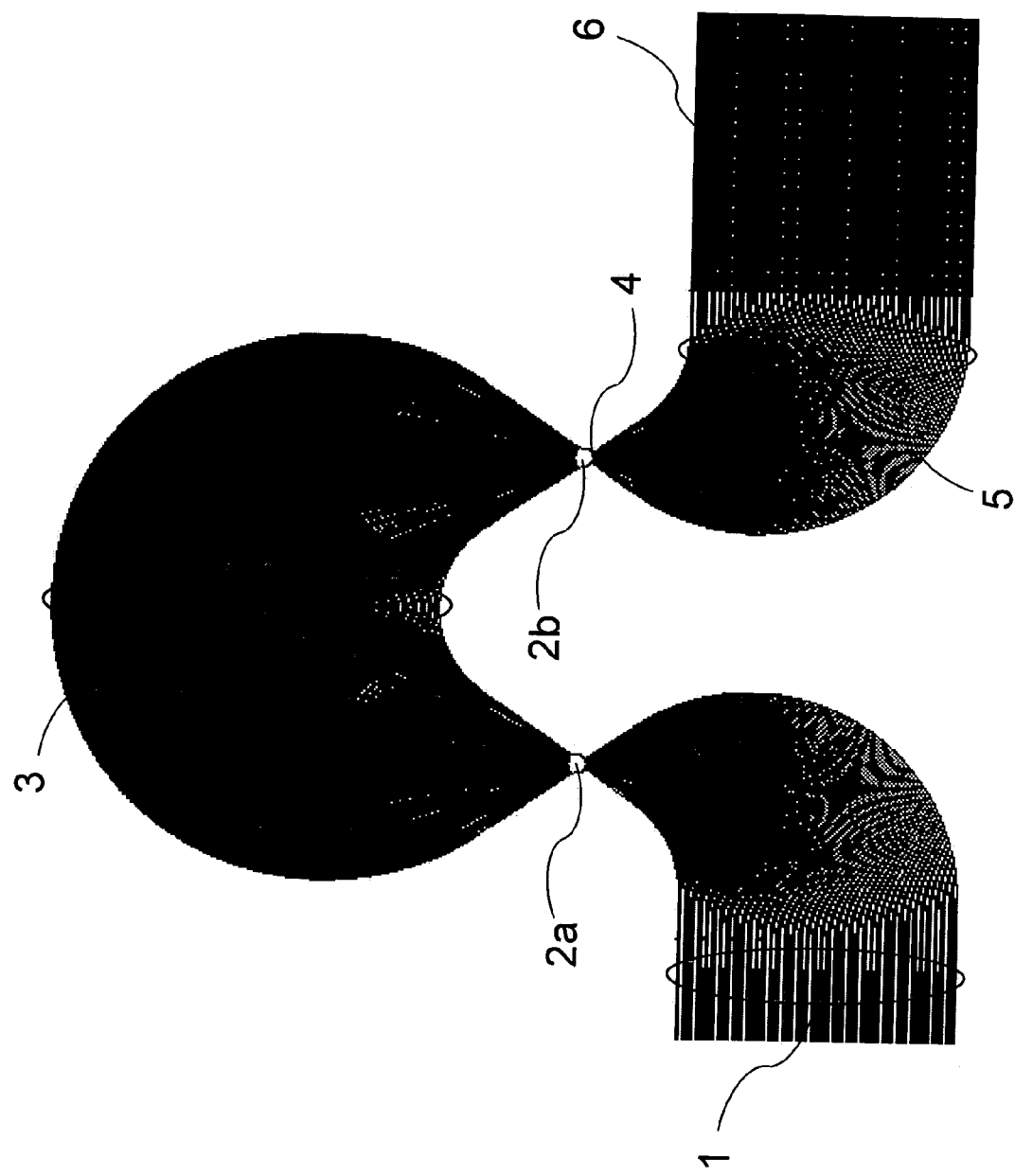

OPTICAL OFF-CHIP INTERCONNECTS IN MULTICHANNEL PLANAR WAVEGUIDE DEVICES

CROSS REFERENCE TO RELATED APPLICATION

This invention claims the benefit under 35 USC 119(e) of prior U.S. provisional application 60/481,828 filed on Dec. 24, 2003.

FIELD OF THE INVENTION

This invention relates to the field of photonics, and in particular to optical off-chip interconnects in multichannel planar waveguide devices, and waveguide devices incorporating such interconnects.

BACKGROUND OF THE INVENTION

In a multichannel waveguide device, such as an integrated wavelength dispersive device (for example a planar waveguide microspectrometer) or an optical planar waveguide circuit containing multiple waveguides, there is an increasing demand to connect a large number of waveguides located on a single chip with output readout circuitry. A similar interconnection problem exists when optically coupling a large number of optical input ports, such as VCSELs (vertical cavity surface emitting lasers) or optical fibre arrays to a multichannel optical waveguide device; or when optically coupling together various multichannel waveguide devices.

The optical interconnect problem is discussed for example in the following references, which are incorporated herein by reference: D. A. B. Miller, "Rationale and challenges for optical interconnects to electronic chips," Proc. IEEE, vol. 88, pp. 728-749 (2000); Y. Li et al., "Optical interconnects for digital systems," Proc. IEEE, vol. 88, pp. 723-863 (2000).

None of the existing interconnection techniques, electrical or optical, is practical for coupling between a large number, up to tens of thousands or more, of waveguides located on a single chip with input/output device or another optical chip.

Optical off-chip interconnects of up to several hundred channels have been demonstrated for example in optical demultiplexers for WDM applications by using coupling from the chip edge to a fibre array held in a v-groove assembly. However, it is not practical to provide off-chip interconnects of several hundreds or more optical channels using present packaging technology because the alignment tolerances and resulting packaging cost becomes prohibitive. This limitation causes a bottleneck in connecting multichannel waveguide devices with input and output devices or other multichannel waveguide devices.

SUMMARY OF THE INVENTION

In this invention a method of optical off-chip interconnects in multichannel planar waveguide devices is proposed. In one embodiment a multichannel planar waveguide device comprises a planar light wave circuit with a multiplicity of optical waveguides. By using the proposed technique, the direction of propagation of the optical signals is altered so that the optical signals are redirected out of the chip plane and the coupling between the planar light wave circuits and the second device is achieved. The latter can be an input or output device or another planar waveguide device. The direction of propagation of light is altered by a reflection or a diffraction element.

Accordingly the present invention provides a multichannel waveguide device comprising an array of waveguide channels located in a plane; each waveguide channel having a redirecting element for redirecting waves propagating in-an in-plane direction to an out-of-plane direction, or redirecting waves propagating in an out-of-plane direction to an in-plane direction; and said redirecting elements being staggered in the direction of said waveguide channels so as to transform a one-dimensional array of guided waves propagating in an in-plane direction in said waveguide channels into a two-dimensional array of waves propagating in an out-of-plane direction or a two dimensional array of waves propagating in said out-of-plane direction into a one-dimensional array of guided waves propagating in said in-plane direction.

It will be appreciated that the invention works in both directions. Waves guided within the multichannel planar waveguide device can be coupled to off-chip ports, or waves originating in off chip ports can be coupled into the multichannel planar waveguide device. Also, it is possible in duplex operation for waves to travel in both directions simultaneously, and such operation is contemplated within the scope of the present invention.

The invention providing a feasible method for off-chip coupling of as many as tens of thousand or more of guided waves and an array of free propagating beams is proposed for the first time. Conversion of 1D array of guided waves to a 2D array of out-of-plane propagating waves and vice versa, the 2D array of out-of-plane propagating waves having a format compatible with other devices, including but not limited to modulators, photodetector 2D arrays, fibre arrays/bundles, VCSELs, or multichannel waveguide devices, is also novel. Other novel disclosures are redirecting light by a diffractive element comprising a waveguide grating and a grating mirror, and utilization of a waveguide cladding with antireflective properties for the out-of-plane propagating wave.

The invention also provides a method of making optical off-chip interconnects in a multichannel integrated waveguide device lying in a plane, comprising redirecting waves propagating in an in-plane direction in each waveguide channel to an out-of-plane direction, or waves propagating in an out-of-plane direction to said in-plane direction; staggering a point of redirection for each said waveguide channel in the direction of said waveguide channels so that a one-dimensional array of waves propagating in said waveguide channels is transformed into a two-dimensional array of waves propagating in an out-of-plane direction or a two-dimensional array of waves propagating in an out-of-pane direction is transformed into a one-dimensional array of waves propagating in an in-plane direction within said waveguide channels; and intercepting or generating said two-dimensional array of propagating waves with an off-chip device.

BRIEF DESCRIPTION OF THE DRAWINGS

The invention will now be described in more detail, by way of examples only, with reference to the accompanying drawings, in which:

FIG. 2c shows examples of unblazed and blazed grating profiles;

FIG. 4 shows a schematics of off-chip interconnects employed in an array waveguide grating wavelength dispersive element.

DETAILED DESCRIPTION OF THE PREFERRED EMBODIMENTS

Figure 1A:
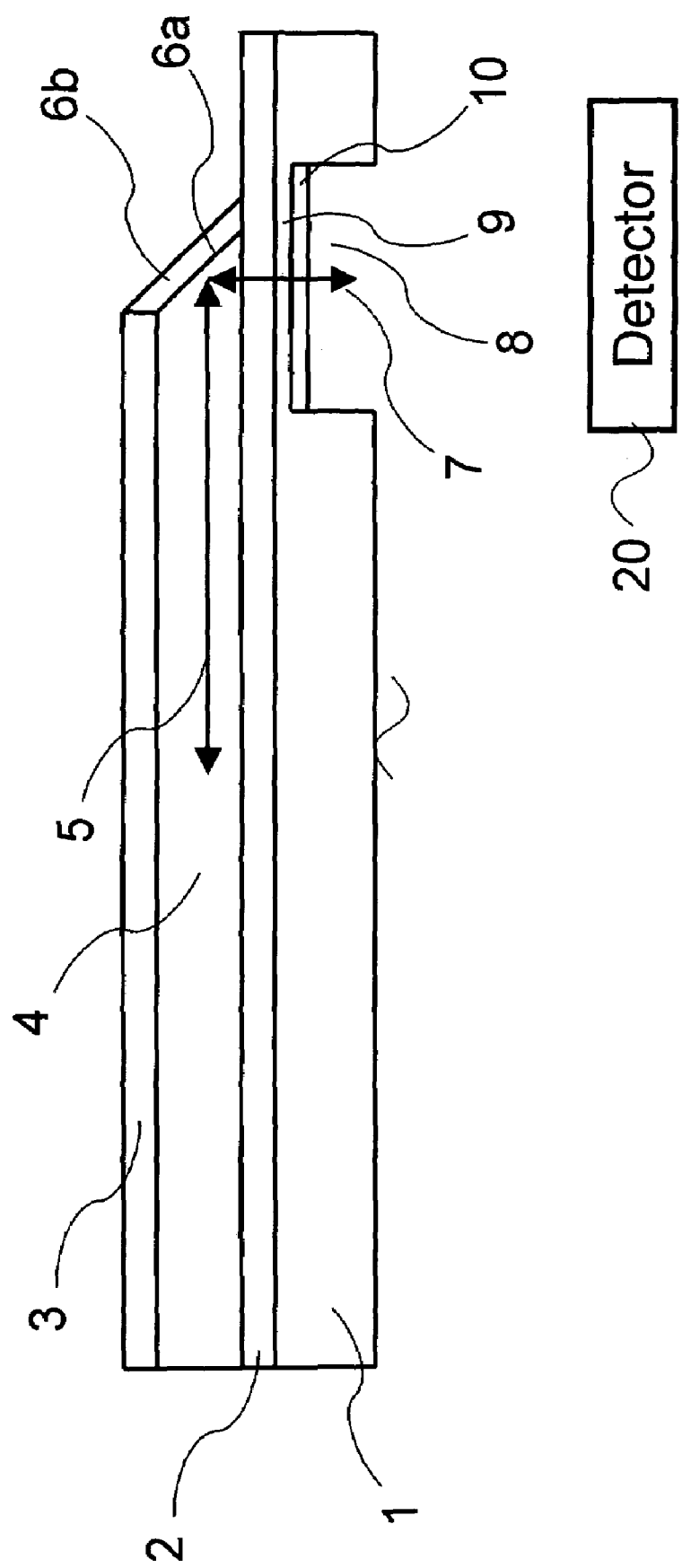
FIG. 1a shows a first embodiment of a coupling device employing a reflection element in a multichannel waveguide device.

In FIG. 1a, a portion of a waveguide forming part of a multichannel device is shown in cross-section. The coupling device, which is integrated on chip, forms an extension of the multichannel device and comprises a substrate 1, a bottom cladding 2, an upper cladding 3 (optional), and a waveguide core 4. A guided wave 5 travels within the waveguide core 4 in a manner known per se. This waveguide core 4 terminates in a bevelled end 6a at a point short of the end of the bottom cladding 2

A reflection element in the form of a mirror facet 6a with optional cladding and reflective coating 6b is located at the bevelled end of the waveguide core 4.

A guided wave 5 travelling in the waveguide core 4 is redirected by the reflection element and emerges through aperture 8 as out-of-plane wave propagating in a direction approximately orthogonal to the plane of the waveguide core 4. To reduce loss due to Fresnel reflection, an antireflective layer 10 can be advantageously used. The residual substrate 9 underneath the reflective element and the thinned aperture 8 are optional, the latter may be used to reduce distance between the reflection element and the second device that intercepts or emits the out-of-plane wave. Cladding 2 can be approximately of a quarter wave thickness or odd multiples thereof and hence act as an antireflective layer.

It will be understood that there are normally a multitude of such waveguides, typically ranging from about 100 to 10,000 or more, each with its own reflection element. The reflection elements are typically staggered in the direction of the waveguide so that light from adjacent waveguide channels emerges from a different point in the longitudinal direction of the waveguides.

These components can be made of conventional materials, for example, using glass, silicon, silicon-on-insulator, silicon nitride, silicon oxynitride, III-V semiconductor materials, polymers, sol-gels, and linear or nonlinear optical crystals, in a manner known per se.

Figure 1B:
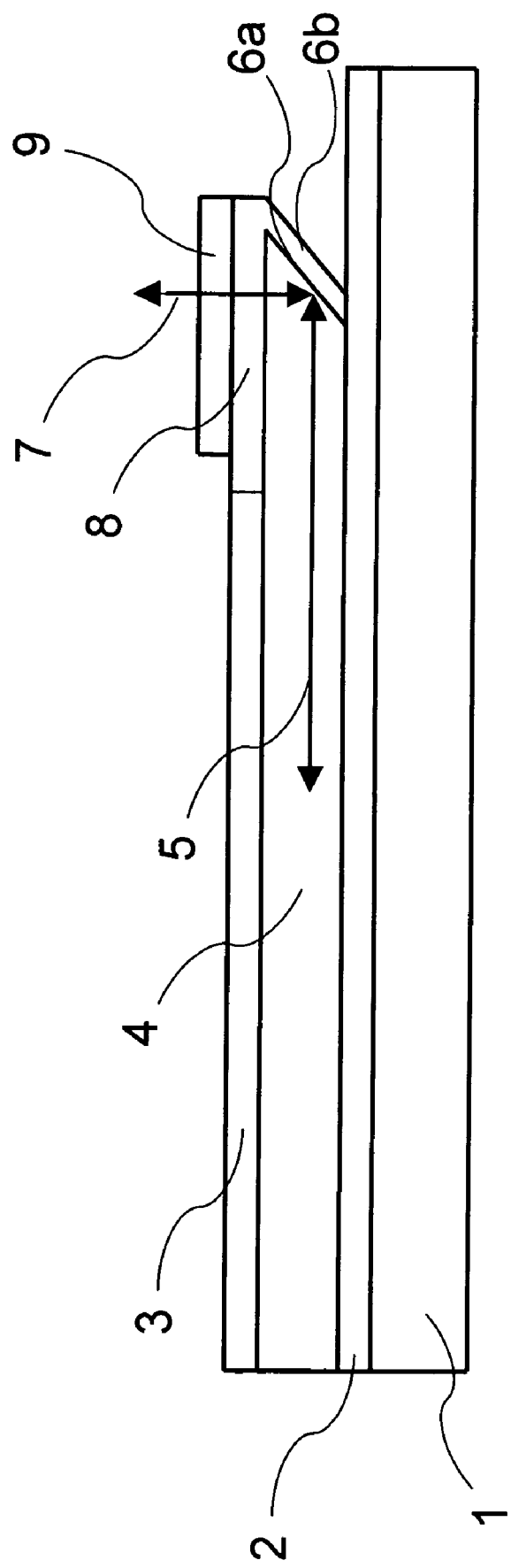
FIG. 1b shows a second embodiment of a coupling device employing a reflection element.

In FIG. 1b, which shows an alternative embodiment, the coupling device comprises a substrate 1, bottom cladding 2, optional upper cladding 3, waveguide core 4, guided wave 5, and mirror facet 6a with optional cladding and/or metal coating 6b, and out-of-plane propagating wave 7. The facet 6 is bevelled inwardly rather than outwardly as that shown in FIG. 1a. As a result the emergent wave 7 travels upwardly out of the plane of the waveguide in this embodiment.

The reflection element 6 comprises an off-vertical facet created in the waveguide so that it reflects light out of the plane of the planar lightwave circuit, converting a guided wave into an out-of-plane propagating wave, or vice-versa. To reduce loss due to Fresnel reflection, an antireflective layer 9 can be advantageously deposited directly on the core 4 or on the upper cladding 8. Alternatively, cladding 8 itself can be approximately of a quarter wave thickness or odd multiples thereof and hence act as an antireflective layer.

Figure 1C:
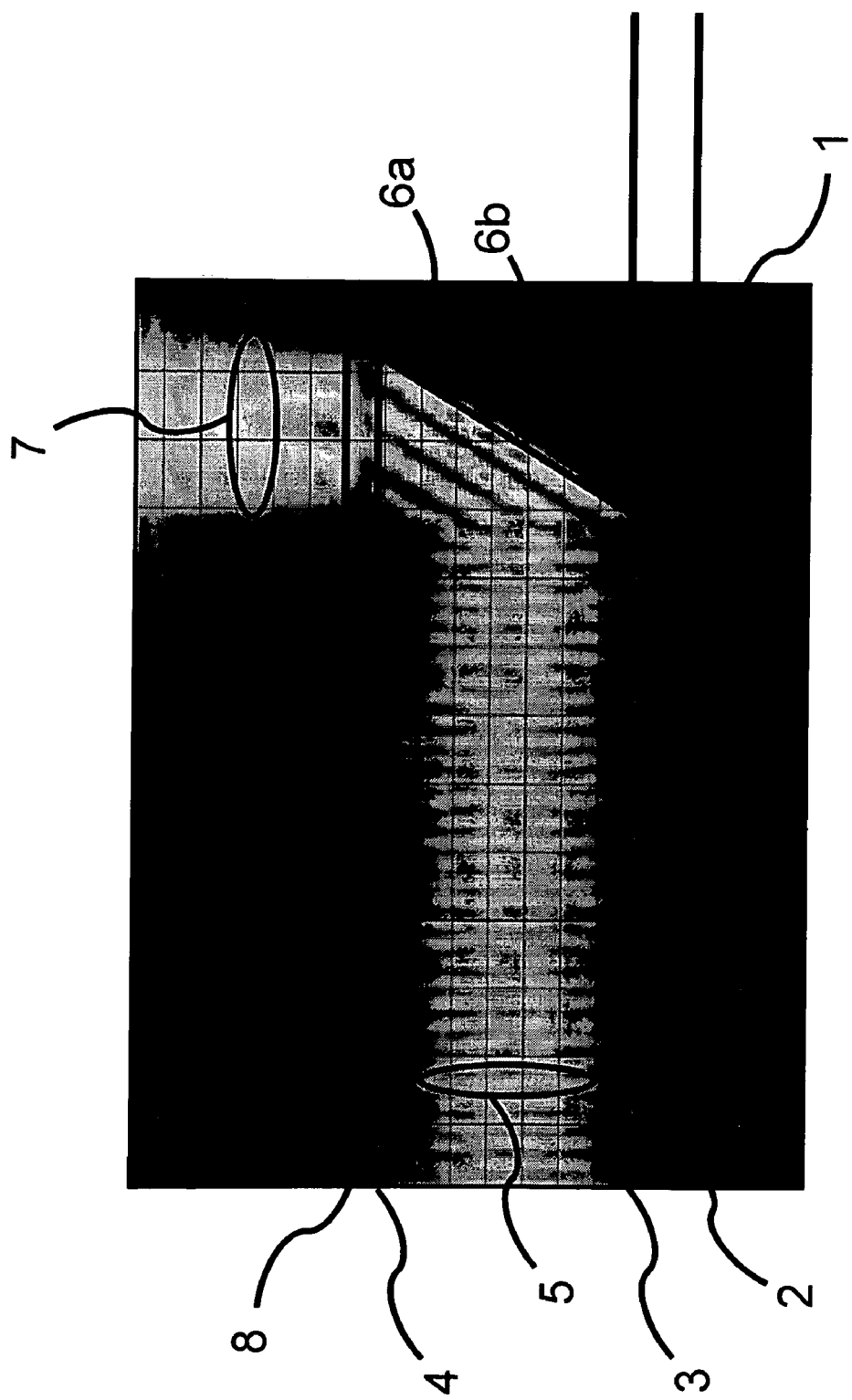
FIG. 1c shows an example of the calculated optical intensity distribution for a guided wave in a silicon-on-insulator (SOI) waveguide redirected by a ~45° waveguide mirror into an out-of-plane propagating wave, and vice-versa.

FIG. 1c shows an example of the calculated optical intensity distribution of a wave 5 guided in a SOI waveguide and redirected to out-of-plane propagating wave 7, or vice-versa, by a ~45° mirror 6a etched into the silicon waveguide core layer and coated with an oxide cladding 6b, as calculated by the Finite Difference Time Domain (FDTD) method. In this example, the top of the SOI waveguide is coated with a single layer 8 of $Si_3N_4$ of refractive index n~2 to form an antireflective quarter-wave coating which at the same time acts as the waveguide upper cladding 8. In this example it was assumed a silicon substrate 1, $SiO_2$ bottom cladding 2 of thickness 0.5 μm, silicon waveguide core of thickness 2 μm delimited by the bottom and upper cladding-core boundaries 3 and 4. The calculated coupling efficiency between a guided wave 5 and a free-propagating beam 7 is >96%, with a beam divergence angle of approximately 30°.

Figure 1D:
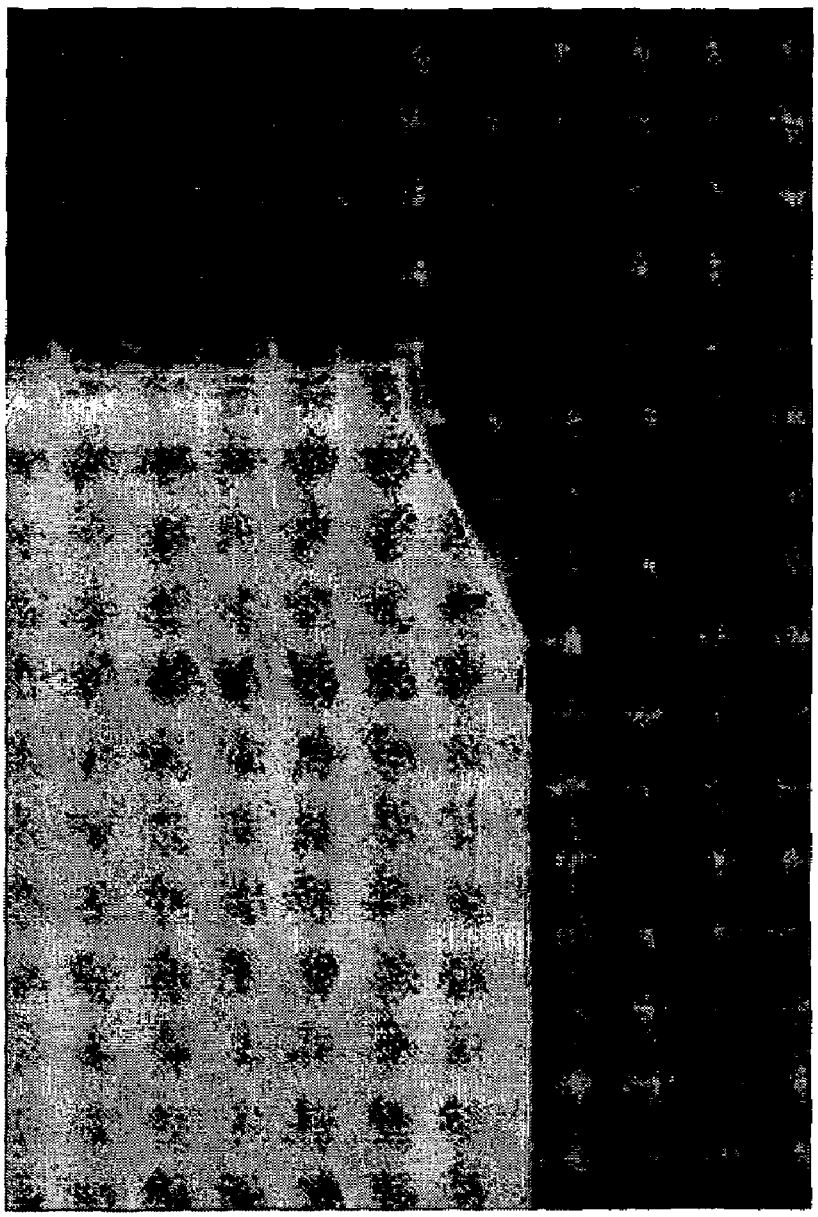
FIG. 1d shows a Scanning Electron Microscope (SEM) image of a waveguide mirror fabricated in an SOI waveguide.

FIG. 1d shows a Scanning Electron Microscope (SEM) image of a mirror in an SOI waveguide fabricated using a directional dry etch. The mirror was fabricated using a directional ion beam etching technique. This technique allows orienting the sample at oblique angles relative to the ion beam, hence producing a beveled mirror plane. An optimum choice of parameters for the etching such as gas selection, flow rate, energy, and sample orientation, as well as for the patterning such as hardmask type and geometry, yielded straight and smooth mirror facets. The dry chemistry used was based on chlorine with the addition of argon and oxygen. Other chemistries known in the art, including a fluorine based chemistry, can also be used.

In the preferred embodiment of this invention the facet inclination of the reflection element is about 45 degrees off the chip plane, but other angles can also be used as far as the reflected light can still be accessed when coupling it to or from the second device.

The reflection element can be fabricated using well-established microfabrication lithographic and etching techniques. In addition to reactive ion etching, in single crystal materials such as silicon, III-V semiconductors and others, anisotropic property of wet etching can be advantageously used to create smooth reflecting facets with required orientation with respect to chip plane.

This can be done simply by appropriately choosing waveguide direction with respect to the crystallographic planes in combination with anisotropic (wet) etching. For example, in single crystal silicon there is a well-defined 45 degree angle between crystallographic directions <100> and <110> that can be used for making a 45 degree mirror facet by anisotropic (wet) etching.

Total internal reflection at the waveguide core and cladding interface (the latter can be air) can be used as light reflection mechanism at the facet, especially in high-index contrast materials such as SOI or III-V semiconductors, but the facet can also be coated with metal or a dielectric stack if required to enhance reflectivity.

Figure 2A:
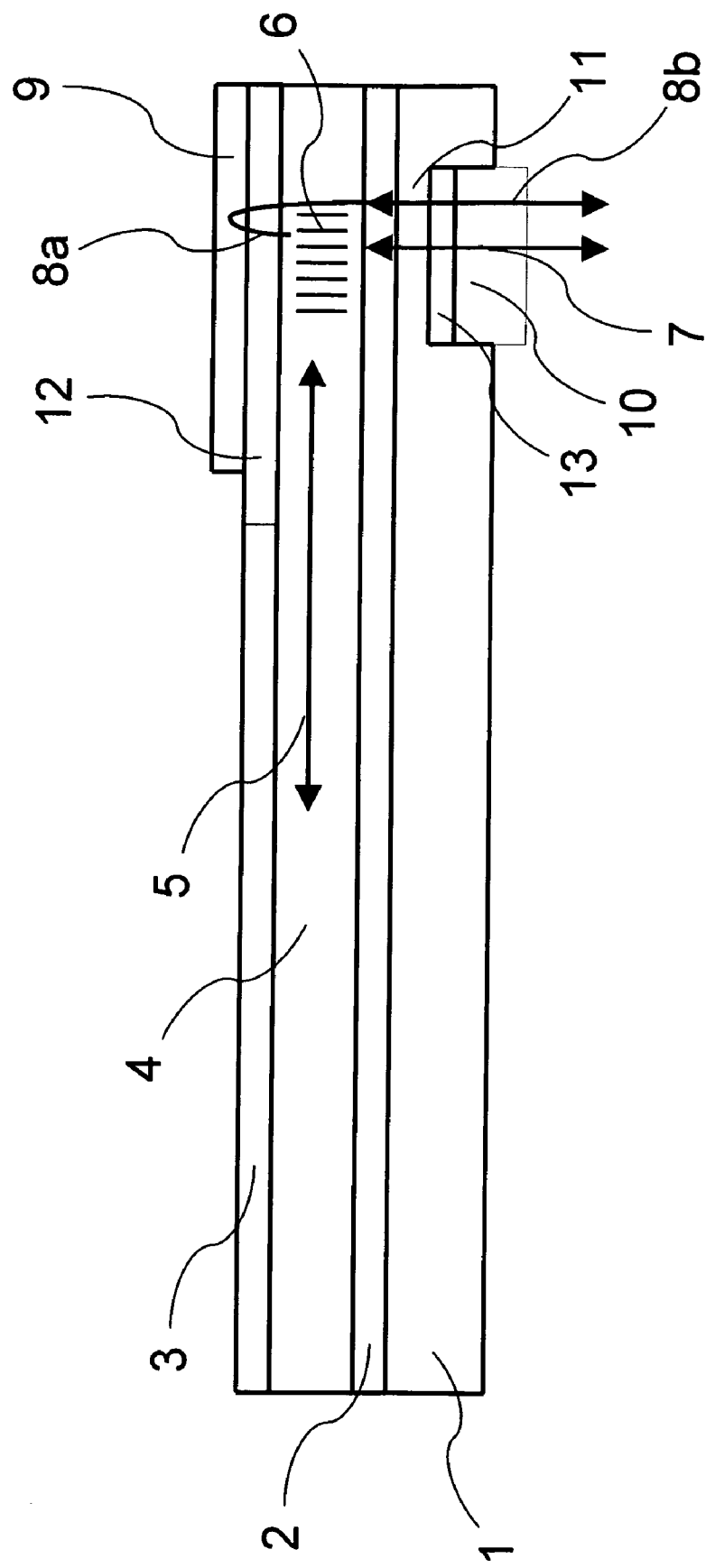
FIG. 2a shows a first embodiment of a coupling device employing a diffraction element.
Figure 2B:
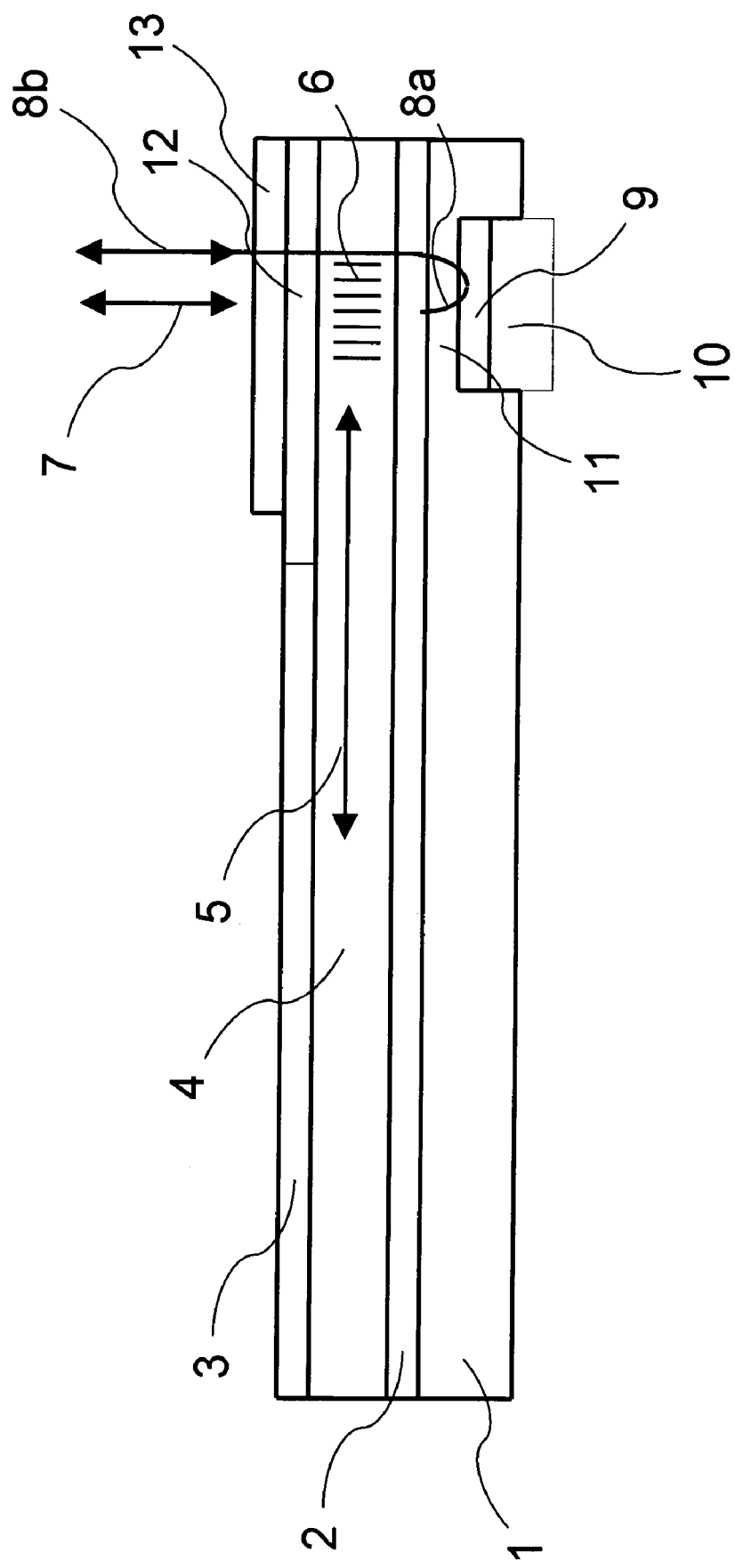
FIG. 2b shows a second embodiment of a coupling device employing a diffraction element.

FIGS. 2a and 2b show yet another embodiment wherein the reflection element is replaced by a diffraction element 6 in the form of a diffraction grating. This diffraction grating causes a guided wave to be diffracted out-of plane, or vice versa. By using a second order Bragg grating, the out-of-plane diffracted waves 7 and 8a propagate approximately perpendicular to the plane of the planar waveguide circuit. To achieve high efficiency of coupling between a guided wave and a free-propagating wave, various techniques can be used, for example blazing the grating facets or reflecting one of the diffracted beams by a mirror 9. When the latter is used, as it is shown in FIGS. 2a and 2b, the propagation direction of one of the diffracted wave (in this example of the wave 8a) can be reverted by a mirror 9 into a wave 8b propagating in approximately opposite direction as 8a. As a result, the two out-of-plane diffractive waves 7 and 8b are propagating approximately in the same direction.

Various blazing profiles known in the art can be used to maximize the diffraction efficiency into a desired order and also to suppress the back-propagating second-order diffraction wave, for example as described in: M. Matsumoto, "Analysis of the blazing effect in second order gratings," IEEE Journal of Quantum Electronics, Vol. 28, No. 10, pp. 2016-2023 (1992). For such purpose, a trapezoidal facet profile (FIG. 2c, profile 4) is desirable, but a triangular blazed facets (FIG. 2c, profiles 5 and 6) may also be advantageously used particularly when the wavelength is detuned from the second order Bragg resonance. FIG. 2c shows several examples of blazed (4, 5, 6, and 7) and unblazed (1, 2 and 3) waveguide grating profiles.

Advantageously, the two co-propagating beams (7 and 8b in FIGS. 2a and 2b) are combined in-phase. To achieve this and hence attain a maximum beam combination efficiency, the overall optical thickness of the layers through which one of the wave propagates and the other does not is such that the resulting phase difference between the two waves is approximately $2\pi m$, where m is an integer number.

Both metallic mirrors and dielectric multilayer mirrors can be used to combine the two diffracted waves into one wave. According to an embodiment of this invention, this can also be achieved by a grating mirror.

According to a preferred embodiment of this invention, a diffraction element comprises a waveguide grating and a grating mirror, the former coupling a guided wave with two out-of-plane propagating waves and the latter combining the two out-of-plane propagating waves.

A waveguide grating is formed in the waveguide core and/or cladding, or part of thereof. The first order diffraction yields two out-of-plane diffracted orders propagating in approximately opposite directions out of the plane of the planar waveguide device. These two diffraction orders are combined in-phase by reflecting one of them by a grating mirror.

The grating mirror comprises a layer of one or two-dimensional periodic array (grating) made of a high index material deposited on a low index spacer. This structure results in a suppressed transmission through the grating mirror layer, hence the mirror effect. The low index spacer thickness is adjusted such that the resulting co-propagating waves add in-phase modulo $2\pi$.

It is advantageous to eliminate any partial reflection of the out-of-plane propagating beams as they cross the core-cladding and the cladding-substrate interfaces when the two beams are combined in downward direction (or the core-cladding and the cladding-superstrate interfaces when the two beams are combined in upward direction). This can be achieved by choosing the bottom cladding (or the upper cladding) of approximately quarter-wave thickness, or odd multiples thereof, such that the Fresnel reflections at the two interfaces interferometrically cancel each other.

Figure 2D:
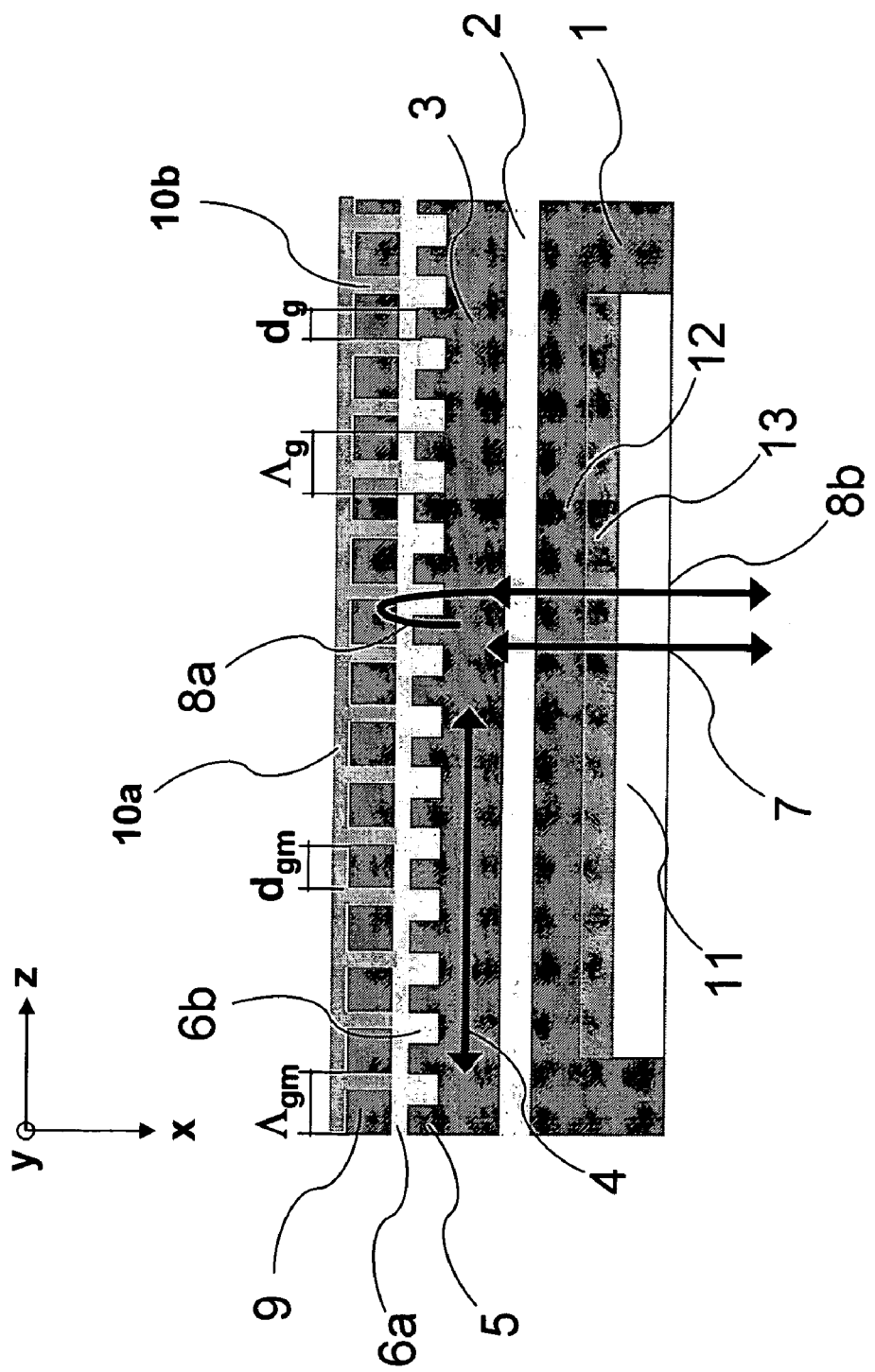
FIG. 2d shows an exemplary embodiment of a coupling device employing a diffraction element comprising a waveguide grating and a grating mirror.

FIG. 2d shows an exemplary embodiment with a diffraction element comprising a waveguide grating and a grating mirror in the SOI platform. The waveguide grating 5 is formed by partially etching the Si waveguide core 3. The low index spacer 6a is a thin layer of $SiO_2$ also filling the grating trenches 6b. Here the high index grating mirror 9 is made of amorphous silicon (a-Si). In a simplified way, the mirror function can intuitively be understood that the portion of light transmitted through each a-Si pillar is phase shifted $\pi$ or odd multiples thereof with respect to the light transmitted in between, the two parts hence canceling each other. $SiO_2$ upper cladding layer 10a (optional) overcoats the grating mirror 9 and fills in the grating mirror trenches 10b. Duty ratios of the grating mirror and the waveguide grating are $r_{GM}=d_{GM}/\Lambda_{GM}$ and $r_G=d_G/\Lambda_G$, respectively, where $\Lambda_{GM}$ and $\Lambda_G$ are the periods of the respective gratings. Guided wave 4 is coupled by the waveguide grating 5 to the out-of-plane waves (7) and (8a). The direction of propagation of the wave 8a is reversed into 8b propagating in approximately the same direction as the wave 7. To assure the maximum interference condition, the two waves 7 and 8b are combined preferably in-phase modulo $2\pi$. The thinned aperture 11, the residual substrate 12 underneath the diffraction element, and the antireflective coating 13 are optional. Thickness of the bottom cladding 2 is advantageously an odd multiple of $\lambda/4$ to provide antireflective properties. As the waves 7 and 8b pass through the core-cladding (3-2) and cladding-substrate (2-1) interfaces, the Fresnel reflected waves originated at the two interfaces are shifted in phase $\pi$, hence interferometricaly cancel each other, yielding antireflectance. Si, a-Si and $SiO_2$ have been chosen as an example to demonstrate compatibility of this coupling device with the standard CMOS process, but it is obvious that the principle of this coupling device is general and that other transparent optical materials can be used in this invention, such as glasses, polymers, sol-gels, semiconductors, and optical crystals.

In this example, spectral response of the coupling device has been centered around 1.55 µm. The central wavelength and the bandwidth can be adjusted by scaling device dimensions, for example of the periods of the two grating and thickness of the layers as well as by using materials with different refractive indices.

An important advantage of this diffraction element comprising a waveguide grating and a grating mirror is its broadband operation with central wavelength determined by the periods of the two gratings. The need for deposition of metal layers or costly dielectric multilayers is avoided. The metal layers are known to cause light loss and polarization dependencies. Yet another advantage of this device is that it is simple to fabricate using standard CMOS process and can be made compact in size. Further enhancement of the coupling efficiency can be achieved by blazing the waveguide grating.

The diffraction element comprises a diffraction grating fabricated in the waveguide core and/or cladding and, as it has been explained, can be used in combination with a mirror element. Grating fabrication techniques well known in the art can be used for this purpose, for example photo-induced gratings in photosensitive glass, optical crystal, sol-gel, and polymers or etched gratings in glass, polymer, sol-gel, silicon, SOI, silicon nitride, silicon oxynitride, non-linear optical crystal, and III-V semiconductors.

The reflection or diffraction element, respectively, redirects light from the waveguide out of the plane of the waveguide towards the second device, or vice-versa. The reflection or diffraction elements from different waveguides are staggered along the length of the device so as to form a two-dimensional array. The second device can be either an optical waveguide or an array of thereof, a photodetector or an array of thereof, or other devices such as imaging optics, collimators, VCSELs, modulators, switches, optical attenuators, optical amplifiers, optical logical gates, routers, multiplexers, demultiplexers, crossconnects, and other lightwave circuits.

Collimating, focussing or beam-shaping optics can also be used between the multichannel waveguide device and the second device. Also, the path length between the reflective or diffractive element and the second device can be minimized by thinning the substrate of the planar waveguide circuit. By minimizing this path length, an efficient coupling can be assured even if the second device is a single mode optical waveguide or an array of thereof. Alternatively, a diffractive element itself can provide desired collimating, focussing, or beam-shaping properties. These properties can be provided by techniques such as chirping and/or apodization of the grating, making a computer generated diffractive optics element, or using optical properties of photonic bandgap or nanoplasmonic structrures, or by a combination of these respective techniques.

The path between the reflective or diffractive element and the second device can comprise an optical waveguide or array thereof, aligned approximately perpendicularly to the planar waveguide circuit plane. The advantages of using such waveguides include no need for collimating, focussing, or beam-shaping, reduced crosstalk between different out-of-plane propagating waves, and ability to bridge any two points (the reflective or diffractive element and the corresponding port in the second device) even at quite large or different distances.

Figure 3A:
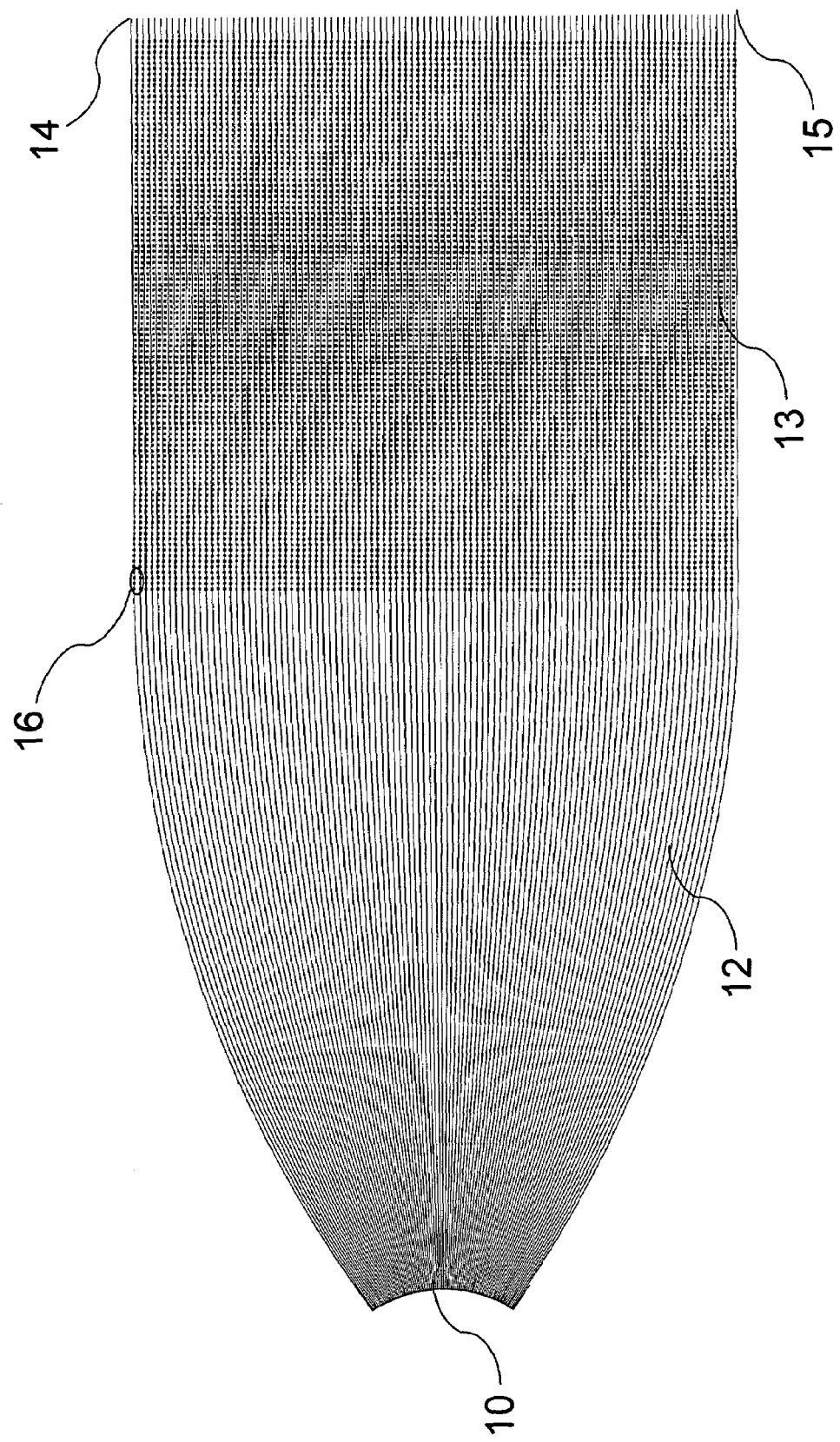
FIG. 3a shows the coupling device applied to a multichannel waveguide device comprising N~10,000 channels.
Figure 3B:
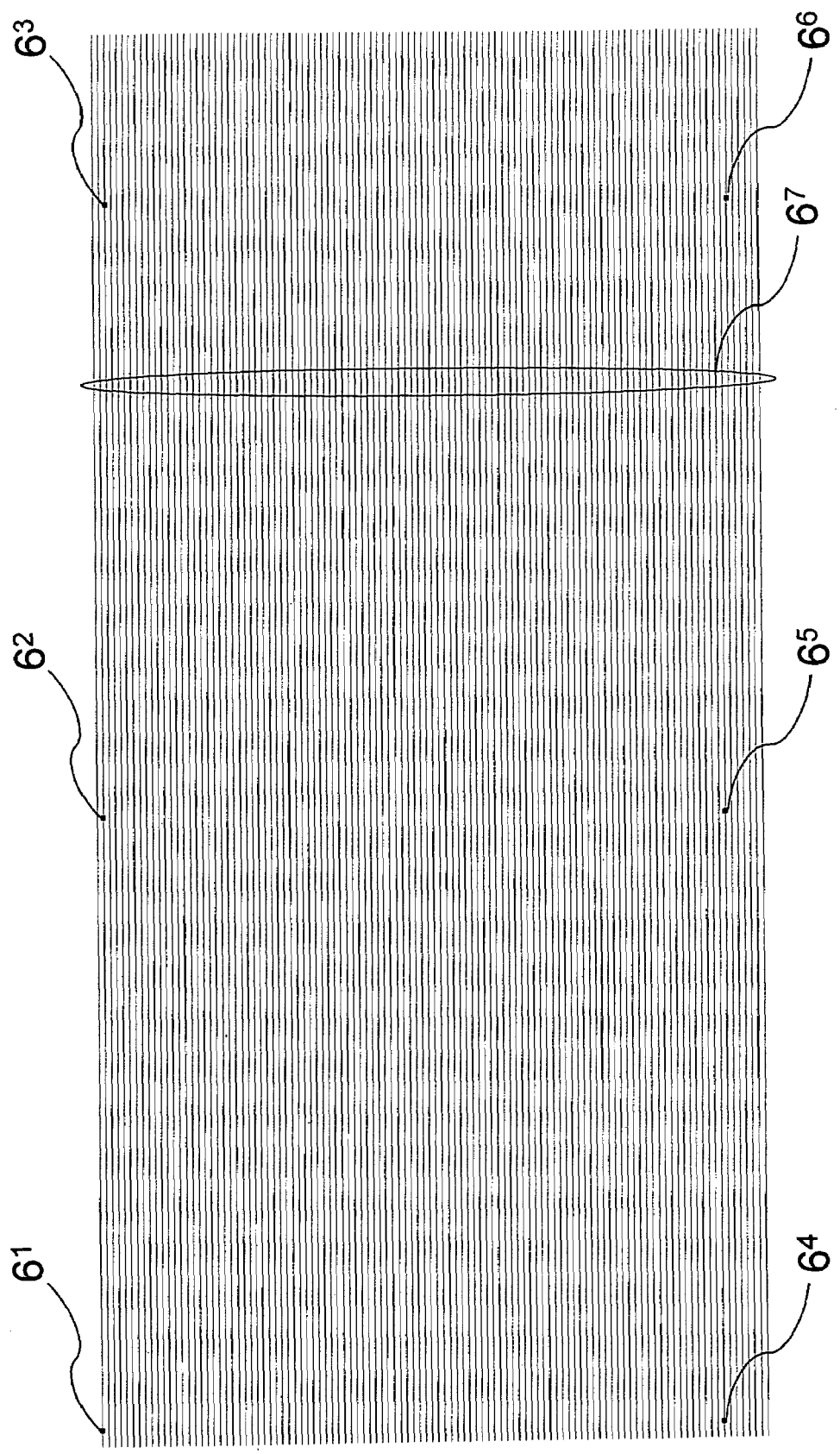
FIG. 3b is a detailed view of a part of the multichannel waveguide devices shown in FIG. 3a comprising out-of-plane coupling elements.

FIGS. 3a and 3b show an example of a proposed off-chip optical coupling for read-out of a multichannel waveguide device comprising N~10,000 channels.

In FIG. 3a, the illustrated multichannel waveguide devices has an arbitrarily shaped optical input 10 of the fan-out section, a multitude of planar fan-out waveguides 12, and 100×100 matrix of reflective or diffractive elements 13 coupling guided waves to an array of free-propagating waves, or vice-versa. In this diagram only each 100$^{th}$ waveguide is shown, e.g. waveguide numbers 1, 101, 201, ... and 10001, so that the element (i,j) of the array of the out-of-plane propagating waves is coupled to the guided wave propagating in the waveguide number N(i,j)=(i−1) *100+j. From description of this invention it is obvious that assigning of a particular element (i,j) of the array of out-of-plane propagating waves to a particular waveguide N(i,j) can be made arbitrarily according to a particular interconnection architecture. The assignment shown is FIGS. 3a and 3b is used as an example only and is not intended to limit the scope of this invention.

Figure 3C:
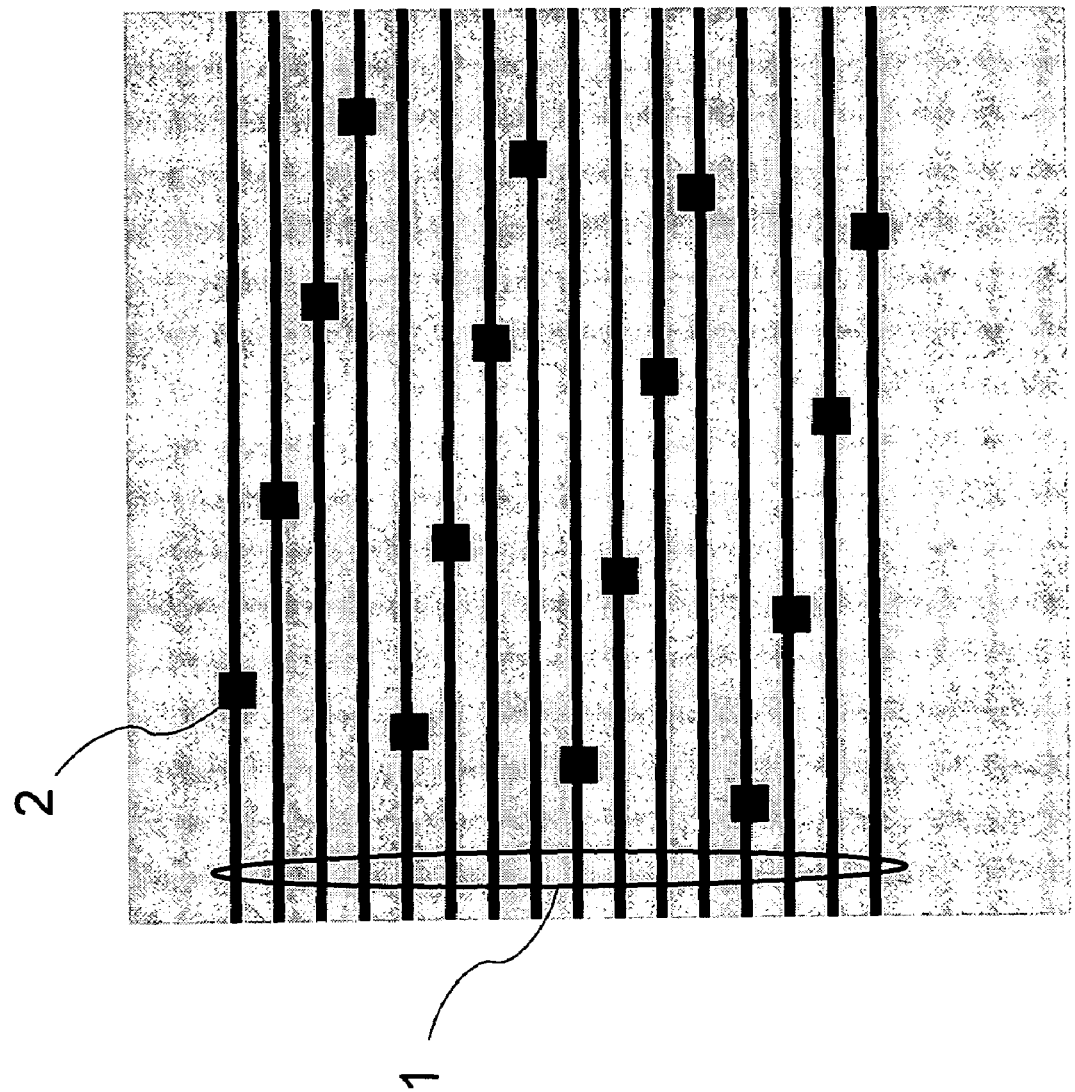
FIG. 3c shows the coupling device applied to a waveguide device comprising N=16 channels.

FIG. 3b shows a detail view of area 16 in FIG. 3a. Reference numbers $16^1$, $16^2$, $16^3$, $16^4$, $16^5$, and $16^6$ represent reflective elements (which could also be diffractive elements) coupling waveguides 1, 2, 3, 101, 102, and 103 with the element (1,1), (2,1), (3,1), (101,1), (101,2) and (101,3), respectively, of the two-dimensional array of out-of-plane propagating waves. Reference $16^7$ represents the bundle of waveguides 1 to 108. The output waveguides start at the input curve 10. In a wavelength dispersive device (for example microspectrometer), this curve is typically located on a Rowland circle. Along this curve, the incoming light comprising multiplicity of wavelengths and confined in the slab waveguide is dispersed into separate wavelengths or bandwidths, each of them being intercepted by a different output channel waveguide. If necessary, the separation between the adjacent waveguides in the output array can be adjusted in fan-out section 12. FIG. 3c shows a simple example of a read-out of 16 waveguide channels (bundle 1) by a 4×4 array of light redirecting elements, wherein 2 is the redirecting element (1,1).

By distributing the reflective or diffractive elements alternatively in output waveguides, for example as shown in FIG. 3a, a one-dimensional output array of guided waves confined in the waveguides on the chip is transformed into a two-dimensional array of optical beams propagating out of the plane of the chip, or vice-versa. This two-dimensional array of optical beams can easily be captured for example by a two-dimensional photodetector array 20. Two dimensional detector arrays with more than 10 million pixels are available for the visible part of the spectrum and beyond (CCDs), potentially thus being able to intercept more than 10 million different channels.

In the near-infrared, InGaAs arrays with more than 300× 300 elements are readily available, which yields about 90,000 channels or more. In the example shown in FIG. 3a, the element (i,j) of the array of the free propagating beams is coupled to the guided wave propagating in the waveguide number N(i,j)=(i−1)$\sqrt{N}$+j, but other assignment can be advantageously used according to a particular interconnection architecture. This two dimensional array of out-of-plane propagating beams can for example be intercepted by a square photodetector array of at least N pixels, or in general by several not necessarily square photodetector arrays.

In another embodiment of this invention, an element (i,j) of free propagating wave is intercepted by a group of several pixels of the detector array.

An important advantage of this arrangement is that the detector array need not be aligned precisely to the array of out-of-plane propagating beams, hence neither with the multichannel planar waveguide device, since the pixel or the group of pixels intercepting a given element (i,j) can be identified and allocated before or after device packaging, using an automated test and calibration procedure.

In a preferred embodiment, the multichannel waveguide device comprises a wavelength dispersive device capable of separating or combining different wavelengths or bandwidths. The wavelength dispersive device comprises an Arrayed Waveguide Grating (AWG) device, a truncated AWG device, an echelle grating device, or a Fourier synthesis filter for example comprising an array of Mach-Zehnder interferometers or ring resonators.

The wavelength dispersive device provides wavelength dependent functions such as separating, combining, adding, dropping, or routing of optical signals, and can be incorporated with other functions such as switching, interconnecting, analyzing, monitoring, amplifying, detecting, or modifying phase, amplitude or wavelength of light in different spectral channels. Examples of such device include but are nor limited to microspectrometers, wavelength routers, wavelength multiplexers and demultiplexers, add-drop filters, channel monitors, optical crossconnects, wavelength converters, and spectral filters including Fourier synthesis filters.

In the example of the wavelength dispersive device shown in FIG. 4, different wavelengths or bandwidths are separated by an array waveguide grating wavelength dispersive element comprising an input waveguide or array of thereof 1, slab waveguide regions 2a and 2b, a phased array 3 of waveguides with constant optical path length difference between the adjacent waveguides, and an output waveguide array 5. The spectrum is formed along the focal curve advantageously located at the Rowland circle 4. Different spectral components (wavelengths or bandwidths) are coupled into different output waveguides 5 starting at the focal curve 4. The output waveguides are so arranged and the reflection or diffraction elements staggered in such a way that each output pixel of the photodetector array 6 intercepts a different wavelength or bandwidth (channel). Alternatively, a group of several pixels of the photodetectors array 6 intercepts a single wavelength or bandwidth (channel). A simultaneous readout of all the channels is achieved with no need for scanning or wavelength selecting mechanism. Another advantage of this arrangement is that the imaging array needs not to be aligned precisely to the array of free propagating beams neither with the wavelength dispersive device.

We claim:

1. A multichannel waveguide device comprising:
   an array of waveguide channels located in a plane;
   each waveguide channel having a diffraction element for redirecting waves propagating in an in-plane direction to an out-of-plane direction, or redirecting waves propagating in an out-of-plane direction to an in-plane direction; and
   said diffraction elements being staggered in the direction of said waveguide channels so as to transform a one-dimensional array of guided waves propagating in an in-plane direction in said waveguide channels into a two-dimensional array of waves propagating in an out-of-plane direction or a two dimensional array of waves propagating in said out-of-plane direction into a one-dimensional array of guided waves propagating in said in-plane direction.

2. The multichannel waveguide device of claim 1, including an exit or entrance port for waves redirected by said redirecting elements, said exit or entrance port having anti-reflective properties.

3. The multichannel waveguide device of claim 1, wherein said waveguide device includes a substrate with a thinned portion providing an exit or entrance port for waves redirected by said diffraction elements.

4. The multichannel waveguide device of claim 3, wherein said substrate with a thinned portion has antireflective coating.

5. The multichannel waveguide device of claim 1, wherein said diffraction element is a blazed waveguide grating.

6. The multichannel waveguide device of claim 1, wherein said diffraction element is an unblazed waveguide grating.

7. The multichannel waveguide device of claim 1, wherein said diffraction element is a computer-generated diffractive optics element.

8. The multichannel waveguide device of claim 1, wherein said diffraction element is selected from the group consisting of: a photonic bandgap structure and a nanoplasmonic structure.

9. The multichannel waveguide device of claim 1, wherein said diffraction element is a waveguide grating associated with a mirror.

10. The multichannel waveguide device of claim 9, wherein said mirror is selected from the group consisting of: a metallic mirror, a dielectric mirror, a mirror grating, and a photonic bandgap material.

11. The multichannel waveguide device of claim 9, wherein said mirror is a mirror grating comprising a one or two dimensional array of a first material having a higher refractive index than a second material separating the first material from said waveguide grating, and wherein the grating geometry and dielectric constants of the material are chosen to provide a high reflectivity for light within a predetermined bandwidth of wavelengths.

12. The multichannel waveguide device of claim 11, wherein said first material is selected from the group consisting of: silicon in its single crystal, amorphous or polycrystalline forms, a III-V semiconductor, silicon nitride, and silicon oxynitride.

13. The multichannel waveguide device of claim 1, further comprising an optical element performing a function selected from the group consisting of: collimating, focussing, waveguiding, beam-shaping, and imaging, to modify the two-dimensional array of waves propagating in out-of-plane direction.

14. The multichannel waveguide device of claim 1, further comprising a two dimensional detector array positioned to receive waves that have been redirected into said out-of-plane direction.

15. The multichannel waveguide device of claim 14, wherein said two dimensional detector array is selected from the group consisting of: a charge coupled device (CCD), a complementary metal-oxide-semiconductor (CMOS) array, and a III-V semiconductor detector array.

16. The multichannel waveguide device of claim 1, wherein said waves propagate into said out-of-plane direction as free propagating waves.

17. The multichannel waveguide device of claim 1, wherein said waves are redirected into said out-of-plane direction as guided waves.

18. The multichannel waveguide device of claim 1, wherein said array of waveguide channels are configured to guide light of different wavelengths or bandwidths.

19. The multichannel waveguide device of claim 18, further comprising a wavelength dispersive element to separate said different wavelengths or bandwidths.

20. The multichannel waveguide device of claim 19, wherein said wavelength dispersive element is selected from the group consisting of: an arrayed waveguide grating, a truncated arrayed waveguide grating device, an echelle grating device, and a Fourier synthesis filter.

21. A multichannel waveguide device comprising:
   an array of waveguide channels;
   each waveguide channel terminating with a diffraction element for redirecting waves exiting or entering said waveguide channels;
   said diffraction elements being staggered in the direction of said waveguide channels so as to transform a one-dimensional array of guided waves propagating in said waveguide channels into a two-dimensional array of waves propagating outside said waveguide channels or a two dimensional array of waves propagating outside said waveguide channels into a one-dimensional array of guided waves propagating in said waveguide channels.

22. The multichannel device of claim 21, wherein said array of waveguide channels is mounted on a substrate with an entrance or exit port for waves redirected by said diffraction elements.

23. The multichannel device of claim 22, wherein said exit port has an antireflective coating.

24. The multichannel device of claim 22, wherein said substrate is thinned in the vicinity of said entrance or exit port.

* * * * *